J. WEISS.
COUPLING.
APPLICATION FILED FEB. 18, 1914.
1,123,445.
Patented Jan. 5, 1915.
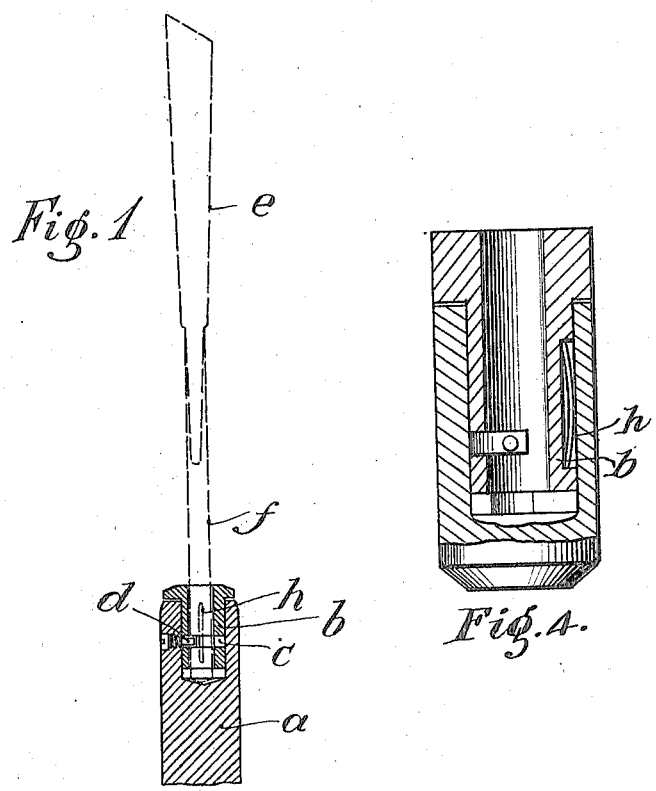
Fig. 1
Fig. 4.
Fig. 2
Fig. 3
Witnesses:
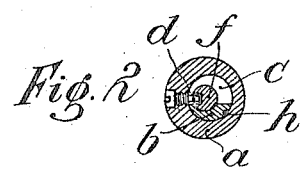
Inventor
Josef Weiss
by his Attorney

UNITED STATES PATENT OFFICE.

JOSEF WEISS, OF MUNICH, GERMANY.

COUPLING.

1,123,445.  Specification of Letters Patent.  Patented Jan. 5, 1915.

Application filed February 18, 1914. Serial No. 819,603.

*To all whom it may concern:*

Be it known that I, JOSEF WEISS, citizen of Germany, residing at Munich, Bavaria, Germany, have invented certain new and useful Improvements in Couplings; and I do hereby declare the following to be a full, clear, and exact description of the invention, such as will enable others skilled in the art to which it appertains to make and use the same.

The object of this invention is to provide an improved device whereby two objects or members can be securely coupled with each other by a simple rotational movement after insertion of a portion of one of said members into a hole, recess or socket formed in the other member.

The invention is illustrated in the accompanying drawing as applied to the connection of a tool to its haft, Figure 1 being a longitudinal section of the coupling, Figs. 2 and 3 being cross-sections; and Fig. 4 a sectional detail. Fig. 2 shows the position in which the coupling is made, and Fig. 3 the position in which it is separated.

In the drawing, $a$ designates a cylindrical haft or holder, and $b$ a tubular member rotatable in a bore or socket formed in the haft $a$. As best shown in Fig. 1, the bore of the tubular member $b$ is eccentric, so that the wall of the tube is of varying thickness around the bore. The tube has a transverse slot $c$ extending somewhat more than halfway around its circumference, and giving access to the bore through the tube wall. Within the socket in the haft $a$ there is a lateral projection $d$, extending into the slot $c$ and so proportioned, that it can extend through the narrower part of the slot into the bore of the tube $b$, whereas when it lies in the wider part of the slot it does not enter the bore of the tube. It will be seen that the projection $d$ lying in the slot $c$, limits the extent to which the tube $b$ can be rotated; in one end position of the tube the projection projects through the tube wall into the bore (Fig. 2) and in the other end position the projection lies wholly within the slot (Fig. 3).

The haft $a$ is used for holding a tool $e$, the tang $f$ of which fits into the tube $b$ and has a lateral recess $g$ for engagement with the projection $d$, this recess being positioned so that when the tang is inserted, the recess is at the same level, in the socket, as the projection $d$.

In order that the tang $f$ can be inserted, the projection $d$ must be outside the bore of the tube $b$, that is to say the tube must be rotated so that the projection $d$ lies in the wider part of the slot $c$, as shown in Fig. 3. The tang is inserted so that the recess $g$ comes to lie opposite or approximately opposite the projection $d$, as shown in Fig. 3; to facilitate the positioning of the tang in this manner, an external mark may be provided on the tube. The tube is then rotated in the direction indicated by the arrow in Fig. 3, whereby the projection $d$ is caused to enter the recess $g$ and lock the tang $f$ in the haft $a$.

In the construction illustrated the projection $d$ is the tip of a screw screwed into the haft $a$, but a permanently fixed projection may be used, or the projection may be made adjustable in some other way.

As indicated by dotted lines in Fig. 1 and in full lines in Fig. 4, a spring $h$ may be arranged in the socket of the haft, to bear against the wall of the tube $b$ and prevent accidental rotation of the latter.

As shown in the drawing, the bore or socket in the haft $a$ is eccentric, so that when the final adjustment is made, as shown in Fig. 2, the eccentricity of the socket corrects the eccentricity of the tube bore, and the tang $f$ is fixed centrally to the haft.

What I claim as my invention and desire to secure by Letters Patent of the United States is:—

1. A device of the character specified, embodying a member provided with an eccentric bore forming a socket, a projection stationarily supported by said member and extending radially into said socket, and a tubular member rotatable in said socket, said tubular member having an eccentric bore of less length than the total diameter of said tubular member through which slot said projection extends whereby rotation of said tubular member in one direction will move said male member transversely of said socket into engagement with said projection and rotation of said tubular member in the opposite direction will move said male member out of engagement with said projection.

2. A device of the character specified, embodying a handle having an eccentric socket at one end thereof, a tubular member rotatable in said socket, said tubular member having an eccentric axial bore and a radial slot of less length than the diameter of the member, said member being adapted to receive a recessed male member, and a stud stationarily supported by said handle and projecting into said socket a distance shorter than the greatest width of said slot and greater than the least width of said slot, whereby rotation of said tubular member in one direction will force the recess of said male member into engagement with said stud.

In testimony whereof I hereunto affix my signature in the presence of two witnesses.

JOSEF WEISS.

Witnesses:
MARIA AMERELLER,
THEODOR TRÄGER.